United States Patent Office

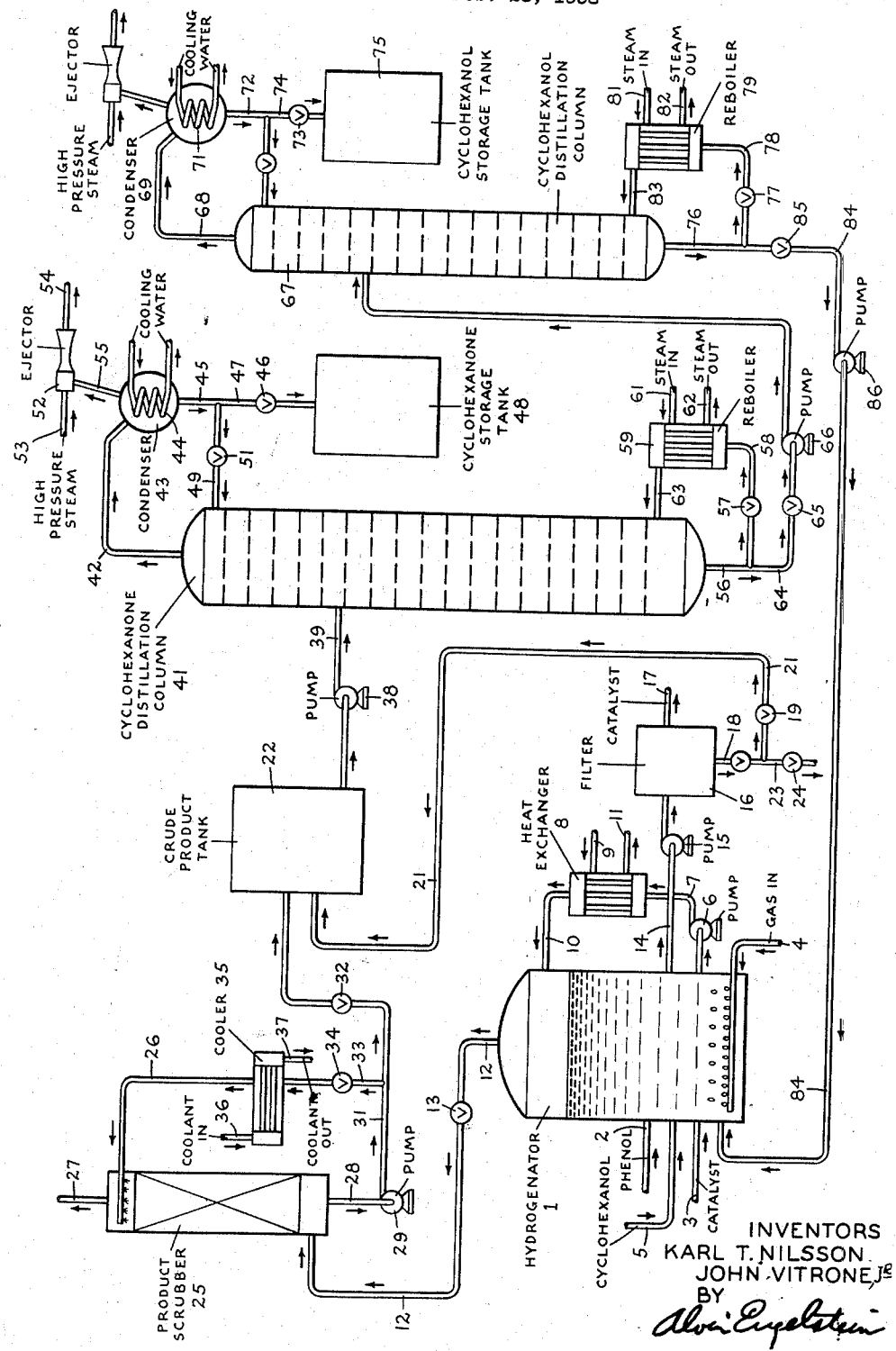

2,873,296
CYCLOHEXANONE

Karl T. Nilsson, Montville, and John Vitrone, Jr., West Paterson, N. J., assignors to Allied Chemical Corporation, a corporation of New York Application February 28, 1958, Serial No. 718,377

3 Claims. (Cl. 260—586)

This invention relates to the production of cyclohexanone and more particularly refers to a new and improved process for the more efficient conversion of phenol into cyclohexanone.

Processes for the production of cylohexanone by hydrogenating phenol in the presence of a palladium catalyst are disclosed in pending U. S. application Serial No. 579,718, filed April 23, 1956, now U. S. Patent No. 2,829,166, and U. S. application Serial No. 635,850 filed June 23, 1957. These applications describe operations wherein hydrogen is charged into a body of phenol in the presence of finely divided palladium catalyst to catalytically hydrogenate the phenol. The resultant reaction products comprise a mixture of cyclohexanone, unreacted phenol and cyclohexanol. Catalyst is removed from the reaction products and the desired cyclohexanone product is recovered by distillation leaving as bottoms a mixture comprising unreacted phenol and by-product cyclohexanol. This unreacted phenol constitutes a considerable portion of the phenol charged to the system, usually an amount of about 10–40% of the phenol feed. While formation of cyclohexanol is small this small amount must be removed continuously or the maintenance of constant conditions required for continuous operation is impossible. Thus it is important to separate out from this mixture, the cyclohexanol formed as a by-product in the system and return the unconverted phenol for further reaction into additional cyclohexanone. Unfortunately, the separation of the small amount of cyclohexanol from the mixture of phenol and cyclohexanol is complicated by the formation of a constant boiling cyclohexanol-phenol mixture (the phenol-cyclohexanol ratio in the constant boiling mixture at atmospheric pressure is about 72:28) which upon distillation results in the carrying over in vapor form of a relatively large amount of phenol by the cyclohexanol vapor. As a matter of fact the difficulties in separation of the cyclohexanol are so great that in practice separation is not generally attempted and instead the mixture of cyclohexanol and phenol is subjected to a separate catalytic hydrogenation employing a Raney nickel catalyst to convert the phenol in the mixture to cyclohexanol. Such procedure requires an additional hydrogenation operation under different conditions and necessitates a market for the cyclohexanol thus produced. If a processor cannot dispose of the cyclohexanol produced by the additional hydrogenation step then of course the mixture of cyclohexanol and unreacted phenol represents a considerable operating loss.

An object of the present invention is to provide an efficient process for conversion of phenol into cyclohexanone with substantially complete consumption of phenol.

Another object of the present invention is to provide a continuous process for the production of cyclohexanone by hydrogenation of phenol in the presence of a palladium catalyst with continuous separation and removal of by-product cyclohexanol formed during the reaction from unconverted phenol and conversion of the then separated unconverted phenol into additional yields of cyclohexanone. Other objects and advantages of the present invention will be apparent from the following description and accompanying drawing.

In accordance with the present invention phenol is continuously catalytically hydrogenated to cyclohexanone with concomitant formation of by-product cyclohexanol and separation and removal of the by-product cyclohexanol from unreacted phenol by continuously passing hydrogen into a mixture maintained at a temperature within the range of about 100–200° C., preferably 100–150° C., of cyclohexanone, phenol, cyclohexanol and finely divided palladium catalyst dispersed therein, said mixture comprising 30–80%, preferably 50–70% by weight cyclohexanone, 10–40%, preferably 15–25% by weight phenol and an amount of cyclohexanol in excess of 39% by weight of the phenol, preferably within the range of 40–60% by weight of the phenol, to catalytically hydrogenate the phenol to cyclohexanone, continuously withdrawing from said mixture a portion of said mixture as crude product comprising cyclohexanone, unreacted phenol and by-product cyclohexanol, continuously introducing phenol and cyclohexanol into said mixtnure to maintain the concentration of phenol and cyclohexanol in the mixture substantially constant, subjecting the crude product to rectification under subatmospheric pressure preferably under reduced pressure below about 300 mm. Hg absolute to remove as vapor substantially pure cyclohexanone and leave as bottoms a mixture of phenol and cyclohexanol, subjecting said bottoms to a second rectification under subatmospheric pressure preferably reduced pressure below about 250 mm. Hg absolute to remove as vapor cyclohexanol in an amount substantially equal to the amount of cyclohexanol concomitantly formed as by-product in the hydrogenation reaction of phenol to cyclohexanone, and returning the bottoms from the second rectification containing unreacted phenol for further hydrogenation to cyclohexanone.

Although it would appear that the separation of by-product cyclohexanol from unreacted phenol would be independent of the principal catalytic hydrogenation of phenol to cyclohexanone, we have after extensive investigation been unable to find a practical commercially economical method of effecting the separation of by-product cyclohexanol from the unreacted phenol. In the second phase of our investigation we directed our attention to the source of the by-product cyclohexanol, namely the hydrogenation reactor in an effort, without success, to remove the cyclohexanol formed during the reaction. Upon further investigation we found surprisingly that the solution to the problem was the addition to rather than the removal of cyclohexanol from the reactor so as to maintain therein an amount of cyclohexanol in excess of 39% by weight of the unreacted phenol in the reaction mixture. In this manner we produced a crude reaction product which, upon withdrawal from the hydrogenator reactor, was amenable to two-stage rectification with removal of pure cyclohexanone, the desired product, from the first stage and the removal of by-product cylohexanol uncontaminated by phenol from the second stage rectification, thereby permitting return of unreacted phenol to the reactor for further conversion into additional cyclohexanone and low ultimate conversion of phenol to cyclohexanol.

In the accompanying drawing is diagrammatically illustrated a method of carrying out the present invention.

Referring to the drawing, the initial charge to hydrogenator 1 may be a mixture of phenol, cyclohexanone, cyclohexanol and finely divided catalyst in substantially the same proportion as would prevail under equilibrium operating conditions. Such a charge would be a mixture of about 30–80%, preferably 50–70% by weight cyclohexanone, 10–40%, preferably 15–25% by weight phenol, 39–95%, preferably about 40–60% cyclohexanol by weight of the phenol, and about 1–5% by weight of finely divided palladium catalyst. Another method of initiating the reaction would be to introduce phenol through line 2 and palladium catalyst through line 3 into hydrogenator 1 and then pass hydrogen gas entering through line 4 in intimate contact with the phenol, having dispersed therein finely divided particles of palladium catalyst until 30–80% of the phenol is converted into cyclohexanone. Thereafter cyclohexanol from an external source is introduced into hydrogenator 1 through line 5 in amount sufficient to constitute 40–60% of the unreacted phenol in the mixture in hydrogenator 1.

The palladium catalyst is preferably deposited upon a finely divided inert carrier such as alumina or carbon and generally the supported catalyst contains from about 1% to about 10% palladium by weight. The quantity of catalyst may be varied within a wide range, for example, from 0.1 part to 10 or even 100 or more parts to each 1,000 parts by weight of phenol charge. Dispersion of the catalyst throughout the body of phenol will ordinarily be maintained by the passage of gas entering through line 4 but additional means such as a stirrer, not shown in the drawing, may be provided to agitate the contents of hydrogenator 1.

Prior to conducting the hydrogenation reaction, the contents of hydrogenator 1 are heated to a temperature of 100–200° C., preferably 100–150° C. The reaction mixture may be brought to the desired temperature by circulating the reaction mixture by means of pump 6, through line 7, heat exchanger 8, wherein it passes in indirect heat exchange with a heating medium such as steam entering through line 9 and discharging through line 11, and the heated reatcion mixture returned through line 10 to hydrogenator 1. The reaction may be conducted at superatmospheric pressure or subatmospheric pressure, but desirably is carried out at approximately atmospheric pressure to low superatmospheric pressure of about 50 p. s. i. g.

After equilibrium conditions are attained in hydrogenator 1 hydrogen entering through line 4 is continuously bubbled up through the liquid contents in hydrogenator 1 to convert the phenol therein to cyclohexanone and concomitantly to produce a small amount of by-product cyclohexanol. The temperature in hydrogenator 1 may be maintained at a constant value by circulating some of the reaction mixture through heat exchanger 8 in indirect contact with a cooling or heating fluid entering through line 9 and discharging through line 11. Unreacted gas is released from the top of hydrogenator 1 through line 12 and valve 13.

A portion of the reaction mixture constituting crude reaction product and containing cyclohexanone, phenol, cyclohexanol and catalyst is continuously discharged from hydrogenator 1 through line 14 and forced by pump 15 through filter 16 wherein catalyst is separated from the crude liquid reaction product and catalyst removed from filter 16 through line 17 may be returned to hydrogenator 1. The crude reaction product free from catalyst is sent through line 18, valve 19 and line 21 to crude product tank 22 which acts in the nature of a storage tank. During extended periods of operation, small amounts of high boilers form as a by-product and accumulate in the reatcion mixture. If it is desired to purge the system of these high boilers to keep them down to a low level, a small amount of the reaction mixture of the order of a few percent may be withdrawn through line 23 and valve 24 and discharged from the system.

Another method of removing reaction product from the reaction mixture in hydrogenator 1 is to introduce excess gas through line 1 in an amount sufficient to remove reaction product as vapor from the liquid body as described in U. S. application Serial No. 635,850, filed January 23, 1957. The vapors carried by the gas leaving the top of hydrogenator 1 through line 12 and valve 13, a mixture of cyclohexanone, phenol and cyclohexanol, are introduced into the bottom of product scrubber 25, wherein it passes upwardly counter-current to a cooling and scrubbing liquid entering the top of scrubber 25 through line 26 to effect condensation of the vapors entering through line 12 and separation of such vapors from the gases. The gases are released from the top of scrubber 25 through line 27. Liquid condensate is withdrawn from the bottom of scrubber 25 through line 28 and sent by pump 29 through line 31 and valve 32 to crude product tank 22. A portion of the liquid condensate is directed through line 33 and valve 34 through cooler 35 wherein it passes in indirect heat exchange with a coolant such as water entering through line 36 and discharging through line 37 and the cooled condensate then introduced into the top of scrubber 25 through line 26.

Crude product containing cyclohexanone, cyclohexanol and phenol is withdrawn from tank 22 and sent by pump 38 through line 39 into cyclohexanone distillation column 41, a suitable fractionating tower equipped with a plurality of spaced bubble cap plates wherein the product is subjected to rectification under reduced pressure below about 300 mm. Hg absolute and a top temperature of about 50–100° C. and a bottom temperature of about 100–150° C. Substantially pure cyclohexanone is removed as vapor through line 42 passing through condenser 43 in indirect heat exchange with cooling coil 44 through which cooling water flows. The condensate then passes down through line 45, valve 46 and line 47 into cyclohexanone storage tank 48. A portion of the condensate is diverted through line 49 and valve 51 into the top of column 41 for cooling and to provide reflux. Vacuum on tower 41 may be obtained by any suitable means as, for example, by ejector 52 through which high pressure steam enters through line 53 and discharges through line 54 and which ejector is connected to condenser 43 by line 55. Heat is provided to column 41 by flowing a portion of the tower bottoms through line 56, valve 57, line 58 and reboiler 59 wherein the bottoms are heated by indirect heat exchange with steam entering through line 61 and discharging through line 62 and the heated bottoms returned to the tower through line 63.

The bottoms in tower 41 are a mixture of phenol, cyclohexanol and a small amount, if any, of cyclohexanone with the cyclohexanol in the mixture constituting about 40–60% by weight of the phenol. These bottoms are withdrawn through line 64 and valve 65 and directed by pump 66 to a second fractionating tower 67 smaller in size but similar in construction to tower 41. This tower is operated at lower pressures and temperatures than tower 41. Tower 67 is operated at a reduced pressure below about 250 mm. Hg and a top temperature within the range of about 50–100° C. and a bottom temperature of about 100–150° C. Due to the introduction of cyclohexanol into hydrogenator 1, there is carried over into the feed entering tower 67 an excess of cyclohexanol which restrains the unreacted phenol and prevents it from passing overhead thereby permitting the release of cyclohexanol vapors from the top of column 67 uncontaminated by phenol vapors. The operation is conducted so as to control the flow of cyclohexanol vapors passing through line 68 to an amount substantially equal to the amount of cyclohexanol formed in hydrogenator 1 as a by-product and in this manner equilibrium conditions and a balance in the system are maintained. The cyclohexanol vapors are condensed in condenser 69, cooled by cooling coil 71 through which cooling water flows and the condensate then passed down through line 72, valve 73 and line 74 into cyclohexanol storage tank 75. Heat is provided to tower 67 by circulating bottoms through line 76, valve 77, line 78, in indirect heat exchange with steam entering reboiler 79 through line 81 and discharging through line 82 and the heated bottoms returned to tower 67 through line 83. The bottoms, a mixture of unreacted phenol and some cyclohexanol, are returned via line 84 and valve 85 by pump 86 to hydrogenator 1. After equilibrium conditions have been attained the amount of cyclohexanol introduced into hydrogenator 1 through line 84 will usually be adequate to maintain the desired cyclohexanol concentration in the reactor but additional cyclohexanol, if necessary, may be supplied from an external source through line 5.

The following example illustrates the present invention:

Into a hydrogenator reaction vessel 12 ft. in diameter and 50 ft. high are charged 161,000 lbs. of cyclohexanone, 44,000 lbs. phenol, 23,000 lbs. cyclohexanol and 2,300 lbs. of finely divided palladium catalyst of 200 mesh composed of 5% palladium on charcoal support. The hydrogenator contents are heated to a temperature of 135° C. under 2 p. s. i. g. pressure and maintained under these conditions. Hydrogen gas at the rate of 69,000 cu. ft. per hour measured under standard conditions of temperature and pressure is continuously introduced into the reaction mixture. Crude reaction product is withdrawn from the hydrogenator at a rate of 9,800 lbs. per hour, part as a vapor and part as a liquid. The liquor is filtered to separate catalyst and the filtrate and condensed vapor are collected together and rectified in a 10 ft. diameter fractionating tower equipped with 60 bubble cap trays maintained under a vacuum of 50 mm. Hg absolute with a top temperature and pressure of 75° C. and 50 mm. Hg absolute and a bottom temperature and pressure of 125° C. and 177 mm. Hg absolute. 7,400 lbs. per hour of substantially pure cyclohexanone are removed from the top of the fractionating tower as overhead product. The tower bottoms, a mixture of unreacted phenol and cyclohexanol, are directed to a second fractionating tower 7 ft. in diameter and equipped with 60 bubble cap trays. The second tower is maintained under vacuum with a top temperature and pressure of 78° C. and 30 mm. Hg absolute and a bottom temperature and pressure of 120° C. and 130 mm. Hg absolute. From the top of the second fractionating tower are removed as overhead product 500 lbs. per hour of cyclohexanol uncontaminated by phenol. The bottoms from the second fractionating tower are sent to the hydrogenator. The feed to the hydrogenator including unreacted phenol and recycled cyclohexanol is at the rate of 8,900 lbs. per hour phenol and 500 lbs. per hour cyclohexanol. Catalyst is also supplied to the hydrogenator at the rate of 4 lbs. per hour.

Although certain preferred embodiments of the invention have been disclosed for purpose of illustration, it will be evident that various changes and modifications may be made therein without departing from the scope and spirit of the invention.

We claim:

1. A continuous process for catalytically hydrogenating phenol to cyclohexanone with concomitant formation of by-product cyclohexanol and separation and removal of the by-product cyclohexanol from unreacted phenol which comprises continuously passing hydrogen into a mixture maintained at a temperature within the range of about 100–200° C. of cyclohexanone, phenol and cyclohexanol in the presence of a palladium catalyst, said mixture comprising 30–80% by weight cyclohexanone, 10–40% by weight phenol and an amount of cyclohexanol in excess of 39% by weight of the phenol, to catalytically hydrogenate the phenol to cyclohexanone with concomitant formation of a small amount of by-product cyclohexanol, continuously withdrawing from said mixture crude product comprising cyclohexanone, unreacted phenol and cyclohexanol, continuously introducing phenol and cyclohexanol into said mixture to maintain the concentration of cyclohexanone at 30–80%, the concentration of phenol at 10–40% and the concentration of cyclohexanol in excess of 39% by weight of the phenol, subjecting the crude product to rectification under subatmospheric pressure to remove as vapor substantially pure cyclohexanone and leave as bottoms a mixture of phenol and cyclohexanol, subjecting said bottoms to a second rectification under subatmospheric pressure to remove as vapor cyclohexanol uncontaminated by phenol, and returning bottoms containing unreacted phenol from the second rectification for further hydrogenation to cyclohexanone.

2. A continuous process for catalytically hydrogenating phenol to cyclohexanone with concomitant formation of by-product cyclohexanol and separation and removal of the by-product cyclohexanol from unreacted phenol which comprises continuously passing hydrogen into a mixture maintained at a temperature within the range of about 100–200° C. of cyclohexanone, phenol, cyclohexanol and finely divided palladium catalyst dispersed therein, said mixture comprising 30–80% by weight cyclohexanone, 10–40% by weight phenol and an amount of cyclohexanol within the range of 39–95% by weight of the phenol, to catalytically hydrogenate the phenol to cyclohexanone with concomitant formation of a small amount of by-product cyclohexanol, continuously withdrawing from said mixture a portion of said mixture as crude product comprising cyclohexanone, unreacted phenol and cyclohexanol, continuously introducing phenol and cyclohexanol into said mixture to maintain the concentration of phenol and cyclohexanol in the mixture substantially constant, subjecting the crude produce to rectification under subatmospheric pressure below about 300 mm. Hg absolute to remove as vapor substantially pure cyclohexanone and leave as bottoms a mixture of phenol and cyclohexanol, subjecting said bottoms to a second rectification under subatmospheric pressure below about 250 mm. Hg. absolute to remove as vapor cyclohexanol uncontaminated by phenol in an amount substantially equal to the amount of cyclohexanol concomitantly formed as by-product in the hydrogenation reaction of phenol to cyclohexanone, and returning the bottoms from the second rectification containing unreacted phenol for further hydrogenetion to cyclohexanone.

3. A continuous process for catalytically hydrogenating phenol to cyclohexanone with concomitant formation of by-product cyclohexanol and separation and removal of the by-product cyclohexanol from unreacted phenol which comprises continuously passing hydrogen into a mixture maintained at a temperature within the range of about 100–150° C. of cyclohexanone, phenol, cyclohexanol and finely divided palladium catalyst dispersed therein, said mixture comprising 50–70% by weight cyclohexanone, 15–25% by weight phenol and an amount of cyclohexanol within the range of 40–60% by weight of the phenol, to catalytically hydrogenate the phenol to cyclohexanone with concomitant formation of a small amount of by-product cyclohexanol, continuously withdrawing from said mixture a portion of said mixture as crude product comprising cyclohexanone, unreacted phenol and cyclohexanol, continuously introducing phenol and cyclohexanol into said mixture to maintain the concentration of phenol and cyclohexanol in the mixture substantially constant, subjecting the crude product to rectification under subatmospheric pressure below about 300 mm. Hg absolute to remove as vapor substantially pure cyclohexanone and leave as bottoms a mixture of phenol and cyclohexanol, subjecting said bottoms to a second rectification under subatmospheric pressure below about 250 mm. Hg absolute to remove as vapor cyclohexanol uncontaminated by phenol in an amount substantially equal to the amount of cyclohexanol concomitantly formed as by-product in the hydrogenation reaction of phenol to cyclohexanone, and returning the bottoms from the second rectification containing unreacted phenol for further hydrogenation to cyclohexanone.

No references cited.